United States Patent [19]

O'Daniel

[11] Patent Number: 4,921,389

[45] Date of Patent: May 1, 1990

[54] LIFTING AND DUMPING APPARATUS

[76] Inventor: Harold W. O'Daniel, 814 Muirfield, Mansfield, Tex. 76063

[21] Appl. No.: 259,188

[22] Filed: Oct. 17, 1988

[51] Int. Cl.[5] .............................................. B65G 65/23

[52] U.S. Cl. .................................... 414/420; 414/421; 414/620

[58] Field of Search ............... 414/408, 419, 420, 421, 414/607, 608, 620

[56] References Cited

U.S. PATENT DOCUMENTS

| | | | |
|---|---|---|---|
| 2,507,583 | 5/1950 | Wellman | 414/421 |
| 2,690,272 | 9/1954 | Quayle | 414/420 X |
| 2,968,411 | 1/1961 | Jegge | 414/421 X |
| 3,024,929 | 3/1962 | Shimmon | 414/420 |
| 3,191,788 | 6/1965 | Hopfield | 414/420 |
| 3,591,028 | 7/1971 | McClung | 414/420 |
| 3,970,342 | 7/1976 | Cotton | 414/620 X |
| 4,095,714 | 6/1978 | Schuster | 414/607 |
| 4,219,300 | 8/1980 | McMillan | 414/420 |
| 4,496,275 | 1/1985 | Harp | 414/421 X |

FOREIGN PATENT DOCUMENTS

| | | | |
|---|---|---|---|
| 0654543 | 12/1962 | Canada | 414/608 |
| 0944358 | 6/1956 | Fed. Rep. of Germany | 414/620 |
| 2025320 | 12/1971 | Fed. Rep. of Germany | 414/420 |
| 1458504 | 12/1976 | United Kingdom | 414/419 |

*Primary Examiner*—Robert J. Spar
*Assistant Examiner*—John VandenBosche
*Attorney, Agent, or Firm*—Charles D. Gunter, Jr.

[57] ABSTRACT

A lifting and dumping apparatus is shown for dumping the contents of a refuse container. A fixed frame is connected to a lifting attachment for moving the fixed frame between a rest position and an elevated position. A support frame is rotatably mounted on the fixed frame and has a pair of fork arms for engaging the refuse container. A piston actuated chain drive rotates the support frame and hence the refuse container between a horizontal position and a dumping position.

3 Claims, 2 Drawing Sheets

LIFTING AND DUMPING APPARATUS

BACKGROUND OF THE INVENTION

1. Field of the Invention

The present invention relates generally to lifting and dumping devices for dumping the contents of a container and, specifically, to such a device for dumping the contents of refuse container.

2. Description of the Prior Art

A variety of fork lift type devices are known in the art for lifting refuse and recycling containers. These refuse and recycling containers, referred to collectively herein as "refuse" containers, are typically steel boxes with or without tops having longitudinally extending side channels adapted to be engaged by the fork arms of a forklift. The containers are lifted from, e.g. a site adjacent a retail store, for loading onto a truck and for transport to a dump or recycling location.

The known prior art lifting devices have included forklifts with forklift arms for engaging the container longitudinal channels. The forklift would lift the container vertically from the ground to a conveyance device, such as a truck. To my knowledge, the existing devices were not used to rotate the container for dumping.

It is an object of the present invention to provide a lifting and dumping apparatus for lifting and dumping the contents of a refuse container by rotating the container once the container has been lifted.

Another object of the invention is to provide such an apparatus which is easily adapted to be mounted on the chassis of a truck.

Another object of the invention is to provide such an apparatus which is simple in design and economical to manufacture and which is extremely safe and reliable in operation.

SUMMARY OF THE INVENTION

The lifting and dumping apparatus of the invention includes a fixed frame connected to a lifting attachment for moving the fixed frame between a rest position and a vertically elevated position. A support frame is rotatably mounted on the fixed frame by a bearing assembly. The support frame has a pair of fork arms for engaging the container longitudinally extending side channels. Actuating means are provided for rotating the support frame, and hence the refuse container, between a horizontal position and a dumping position.

Preferably a piston actuated chain drive is provided for rotating the support frame. The support frame has top, bottom and opposing sides which enclose a support plate. A central sprocket is mounted on the support plate and extends horizontally from the support plate through a central sprocket opening provided in the fixed frame. The chain drive includes a double ended piston, the opposing ends of which are connected to a drive chain. The drive chain is engaged with the central sprocket for rotating the central sprocket and associated support frame between a horizontal position and a dumping position.

Additional objects, features, and advantages will be apparent in the written description which follows.

FIG. *2a* is a simplified view of the fixed frame and support frame of the device of the invention showing the initial rotation of the support frame in dotted lines.

FIG. *2b* is similar to FIG. *2a* and shows the continued rotation of the support frame in dotted lines.

Figure 3:
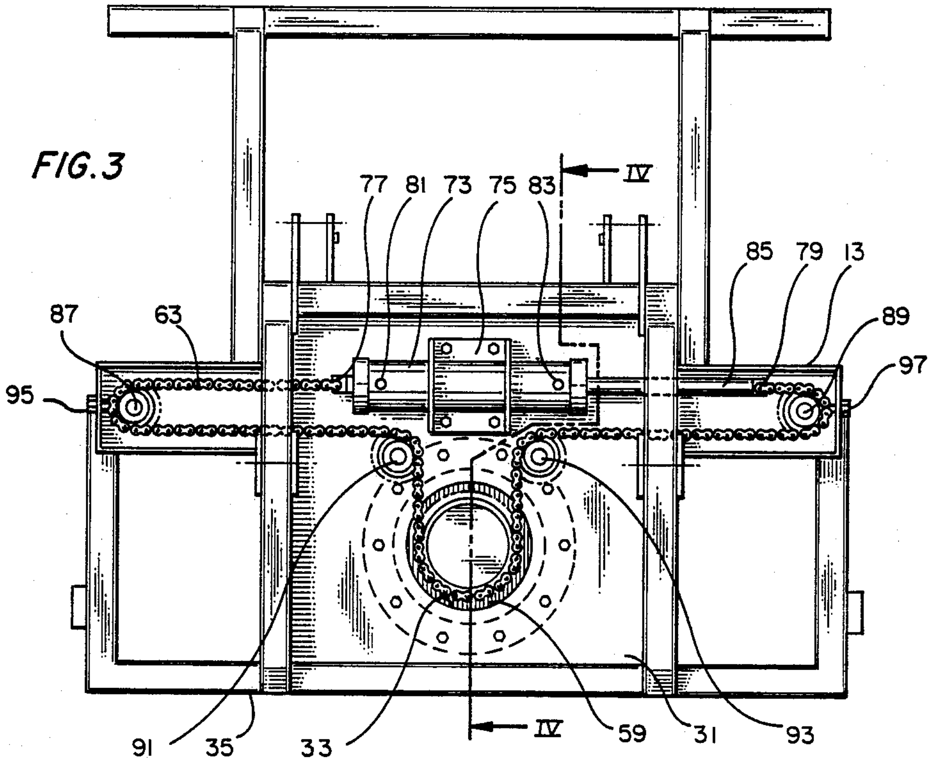

FIG. 3 is a rear, isolated view of the fixed frame and support frame of the invention showing the piston actuated chain drive which is used to rotate the support frame.

Figure 4:
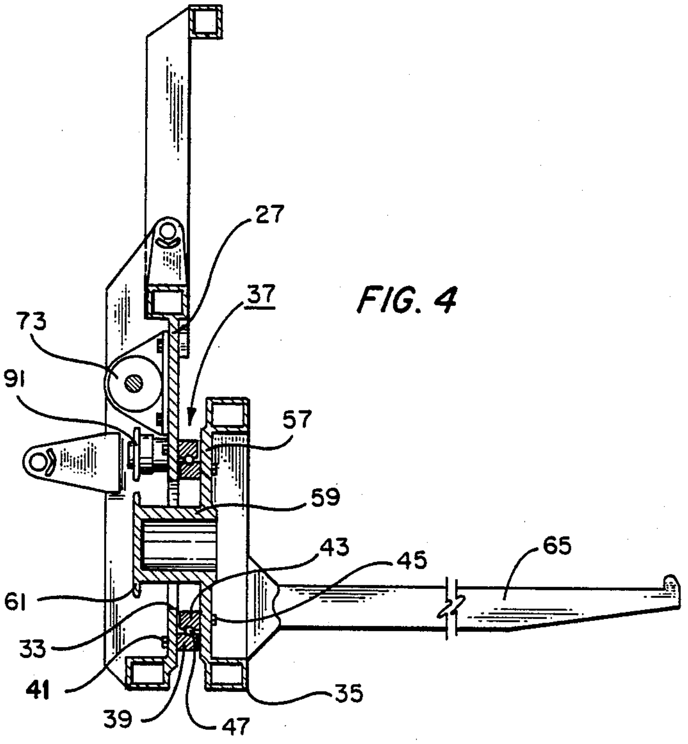

FIG. 4 is a side, partial cross-sectional view taken along lines IV—IV in FIG. 3.

DETAILED DESCRIPTION OF THE INVENTION

Figure 1:
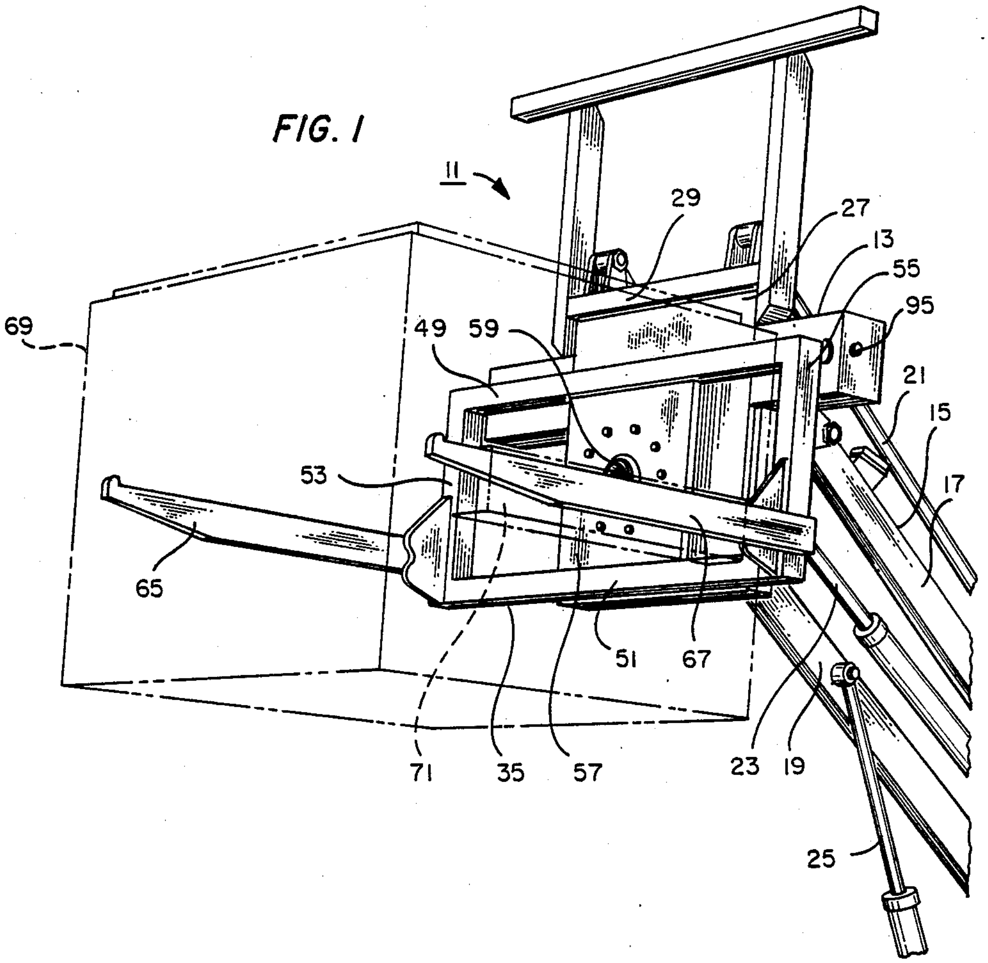
FIG. 1 is a perspective view of the lifting and dumping apparatus of the invention shown engaging the longitudinally extending channels of a refuse container, the container being shown in dotted lines.

FIG. 1 shows the lifting and dumping apparatus of the invention designated generally as 11. The apparatus 11 includes a fixed frame 13 which is connected to a lifting attachment 15. The lifting attachment 15 includes upper and lower lifting arms 17, 19 and a plurality of lifting pistons having piston rods 21, 23, 25. The piston rods 21, 23, 25 and associated lift pistons are hydraulically actuated for moving the fixed frame 13 between a rest position and a vertically elevated position, as shown in FIG. 1.

The lifting attachment 15 has an opposite end (not shown) which bolts to the chassis of a standard truck by means of U-bolts. The lifting attachment 15 is commercially available as the Model 8000 Container Carrier from G&H Manufacturing, 1018 North Commercial Blvd., Arlington, Texas.

As shown is FIGS. 1 and 3, the fixed frame 13 has a vertical wall portion 27 with an exterior surface 29 and an interior surface 31. The vertical wall portion 27 is provided with a central sprocket opening 33.

A support frame 35 is rotatably mounted on the fixed frame 13 by a bearing assembly 37. The bearing assembly 37, as shown in FIG. 4, includes a lower bearing race 39 secured by a plurality of bolts 41 to the vertical wall portion 27, an upper race 43 secured by bolts 45 to the support frame 35, and a plurality of balls 47.

As best seen in FIG. 1, the support frame 35 has a top frame 49, a bottom frame 51 and opposing sides 53, 55. The frame top, bottom and opposing sides enclose a support plate 57. A central sprocket 59 has a shaft portion which extends perpendicular to the support plate 57 through the central sprocket opening 33 provided in the vertical wall portion 27 of the fixed frame 13. The outer extent of the shaft portion has a plurality of teeth 61 for engaging a drive chain 63.

The support frame 35 also has a pair of spaced-apart fork arms 65, 67 which extend outwardly, perpendicular to the support frame members 51, 53, 55 for engaging the longitudinal channels of the refuse container. FIG. 1 shows a typical container 69 with the channels 71 shown in dotted lines.

As shown in FIG. 3, the fixed frame 13 is provided with actuating means for rotating the support frame 35, and hence the refuse container 69, 180° between the horizontal position shown in FIG. 1 and a dumping position, as illustrated in FIGS. *2a* and *2b*. The actuating means preferably includes a piston actuated chain drive. A double ended piston cylinder 73 is mounted on the interior surface 31 of the fixed frame by means of a bracket 75 and includes an output shaft having opposing ends 77, 79. A piston ring (not shown) is carried approximately midway along the shaft and is located between hydraulic input and output ports 81, 83. By suppling or withdrawing hydraulic fluid from ports 81, 83 the piston shaft 85 can be moved back and forth within the cylinder 73. Double ended piston cylinders are well known in the art and are commercially available.

Each of the opposing ends 77, 79 of the piston shaft 85 is attached to an end of the drive chain 63. The drive chain passes from the piston shaft 85 over adjustable idler sprockets 87, 89, past fixed idler sprockets 91, 93 and over the central sprocket 59. Sprockets 87, 89 are adjustably mounted on the threaded shafts of adjustment bolts 95, 97 which are located within openings in the fixed frame 13.

The operation of the device will now be described. The apparatus of the invention can be used to lift and dump container 69 by first engaging the fork arms 65, 67 within the container side channels 71. The lifting attachment 15 can be actuated, causing piston rods 21, 23, 25 to extend from their respective cylinders to raise the lifting attachment from the rest position on the ground to the vertically elevated position shown in FIG. 1. The lifting attachment 15 can thus be used to transport the container 69 to another location or to place the container on the back of a truck or other conveyance means.

Figure 2A:
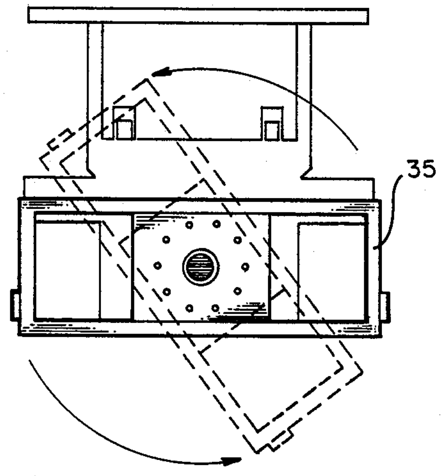
Figure 2B:
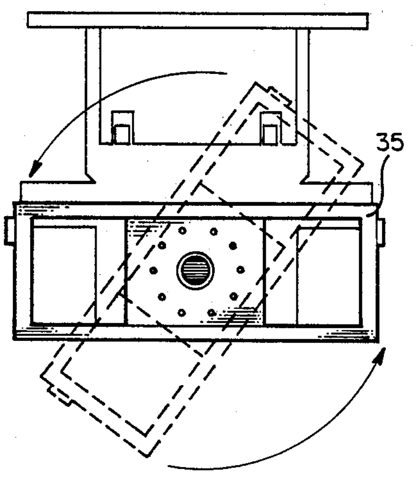

To dump the container 69, the piston cylinder 73 is actuated by applying hydraulic fluid through the port 83 and exhausting hydraulic fluid through the port 81. This causes the piston shaft 85 to move from the right to the left, as shown in FIG. 3, thereby causing the drive chain 63 to move about the idler sprockets and the central sprocket 59. As the drive chain 63 moves about central sprocket 59 in a counter-clockwise direction, the central sprocket is rotated, causing the support frame 35 to rotate approximately 180° between a horizontal position and a dumping position. FIG. 2*a* shows the initial dump cycle in which the support frame 35 moves through an arc of approximately 60°. FIG. 2*b* shows the continued rotation of the support frame 35 through an arc of approximately 130° from the horizontal, it being understood that the rotation would continue through an arc of approximately 180°. The support frame is returned to the horizontal position by reversing the flow of hydraulic fluid to the ports 81, 83 of the piston cylinder 73.

An invention has been provided with several advantages. The apparatus of the invention can be used to lift a refuse container for relocation or transport. The apparatus can also be used to rotate the trash container for dumping. The apparatus can also be used to lift and rotate a container for welding and other repair and maintenance operations. The actuating means for rotating the container is simple in design and economical to manufacture and is extremely reliable in operation.

While the invention has been shown in only one of its forms, it is not thus limited but is susceptible to various changes and modification without departing from the spirit thereof.

I claim:

1. A lifting and dumping apparatus for dumping the contents of a refuse container, the container having a pair of longitudinally extending side channels, the lifting and dumping apparatus comprising:

a fixed frame connected to a lifting attachment for moving the fixed frame between a rest position and a vertically elevated position;

a support frame rotatably mounted on said fixed frame by a bearing assembly, said support frame having a pair of fork arms for engaging said container side channels;

wherein said fixed frame has a vertical wall portion with an exterior surface and an interior surface, said vertical wall portion being provided with a central sprocket opening, and wherein said bearing assembly extends between said vertical wall exterior surface and said support frame said support frame having top, bottom and opposing sides which enclose a support plate, said central sprocket being mounted on said support plate and extending horizontally from said support plate through said central sprocket opening of said fixed frame;

a piston actuated chain drive independent of the lifting attachment for rotating the support frame, and hence the refuse container, approximately 180° between a horizontal position and a dumping position at any of a plurality of selected vertically elevated positions of said lifting attachment; and wherein said piston actuated chain drive includes a double ended piston having opposing ends each of said opposing ends being directly connected to the terminating end of a continuous length of drive chain, said drive chain being engaged with said central sprocket by routing said drive chain about said central sprocket, said continuous length of drive chain running from one of said piston opposing ends to the other for rotating said central sprocket and associated support frame between a horizontal position and a dumping position.

2. The lifting and dumping apparatus of claim 1, wherein said piston actuated chain drive further includes a pair of adjustable idler sprockets and a pair of fixed idler sprockets, said drive chain being routed over said fixed sprockets and adjustable sprockets between said central sprocket and said double ended piston.

3. The lifting and dumping apparatus of claim 2, wherein said double ended cylinder is horizontally mounted on said internal surface of the fixed frame vertical wall portion, said central sprocket opening being located vertically below said double ended cylinder.

* * * * *